UNITED STATES PATENT OFFICE.

A. H. TAIT, OF NEW YORK, N. Y., ASSIGNOR TO GEO. B. HARTSON, OF SAME PLACE.

IMPROVEMENT IN DEFECATING SUGAR-JUICES.

Specification forming part of Letters Patent No. 24,592, dated June 28, 1859.

*To all whom it may concern:*

Be it known that I, AUGUSTUS H. TAIT, of the city, county, and State of New York, have invented a certain new and improved method of Defecating Cane-Juice and Sirups of Sugar; and I do hereby declare that the following is a full, clear, and exact description thereof.

My invention relates to the defecation of cane-juice and sirups of sugar; and it consists of effecting this purpose by means of the sulphate of tin, to be applied substantially in manner hereinafter described.

For treating five hundred gallons of cane-juice or sirup I use from half a gallon to three gallons (according to the quality of the juice) of a solution of sulphate of tin, either the sulphate of the protoxide, prepared by dissolving the tin direct in hot sulphuric acid of the usual strength found in commerce, slightly diluted with water, or by dissolving the hydrate of tin (precipitated from the muriate by an alkali) in slightly-diluted sulphuric acid of such strength, or the sulphate of the peroxide or deutoxide, prepared by dissolving the hydrate (prepared by precipitating the hydrate of tin from the nitromuriate of tin by an alkali) in slightly-diluted sulphuric acid of the usual strength found in commerce; but I prefer the protosulphate, from its greater solubility in water. To this solution of sulphate of tin I add, for each gallon, two gallons of water previous to using. I pour this solution in the cane-juice or sirup, mix it well, and immediately add as much milk of lime (composed of slaked lime and water) as will nearly neutralize all the acid in the juice, showing a slight acid reaction on blue litmus-paper. The temperature is now to be raised in the defecator to 190° Fahrenheit, the liquor skimmed, then brought to the boiling-point, and allowed to settle or filtered. The quantity of lime required will be more than necessary to neutralize the sulphuric acid of the sulphate of tin; but the excess will depend upon the quantity of free acid contained in the juice.

The above may be used in combination with sulphate of alumina, taking the precaution to use sufficient lime to neutralize the latter.

What I claim as my invention, and desire to secure by Letters Patent, is—

The employment of the sulphate of tin, applied in manner substantially as herein described, for defecating cane-juice and sirups, as set forth.

A. H. TAIT.

Witnesses:
J. SPANGENBERG,
JOHN DEKIN.